Nov. 30, 1943.  C. L. STRAUSS  2,335,815

MEASURING MEANS FOR SOFT SOLIDIFIED MATERIALS

Filed Aug. 2, 1941

Carol L. Strauss
INVENTOR.

BY Ezekiel Wolf
her Attorney

Patented Nov. 30, 1943

2,335,815

UNITED STATES PATENT OFFICE 2,335,815

MEASURING MEANS FOR SOFT SOLIDIFIED MATERIALS

Carol L. Strauss, Bangor, Maine

Application August 2, 1941, Serial No. 405,215

6 Claims. (Cl. 31—11)

The present invention relates to a measuring device and in particular to a measuring device for measuring volumes of solidified but comparatively soft or viscous materials as shortening, greases, butter, etc. In the use of solidified shortening for baking, etc., such as butter, vegetable and animal fats it is common practice to prescribe in recipes for cooking and baking the use of such shortenings, either by volume or weight.

The present invention has for its object a means by which such weights or volumes can be readily and accurately measured out of the original container holding such shortening materials. In many cases solidified shortening preparations are sold in tin containers hermetically sealed around the top edge of the container. It is an object of the present invention to attach such a measuring unit either on the outside of the top of the container or to place it loosely within the can on the top of the shortening, separated from the shortening, if desirable, by a sheet of wax paper. In this use and application, the measuring means is preferably rather flat and thin so that it will not project from the container to any substantial extent but rather rest freely on top of the material within the container so that taller containers are not necessary. The device is operated merely by twisting a portion serving as a stem, thus carving out the volume of material being measured.

Figure 3:
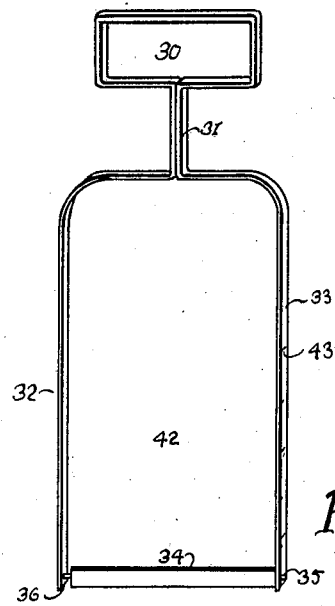
Figure 7:
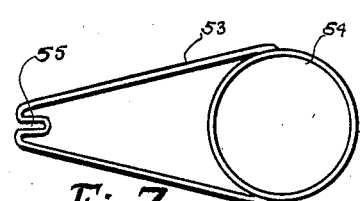
Figure 1A:
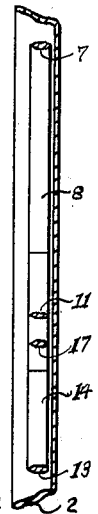
Figure 4:
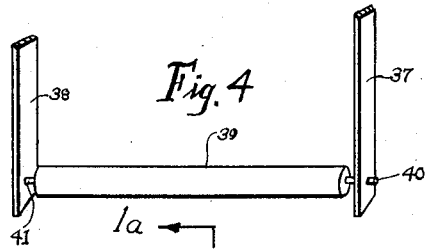
Figure 6:
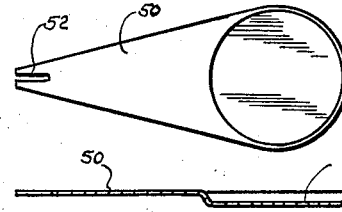
Figure 5:
Figure 1:
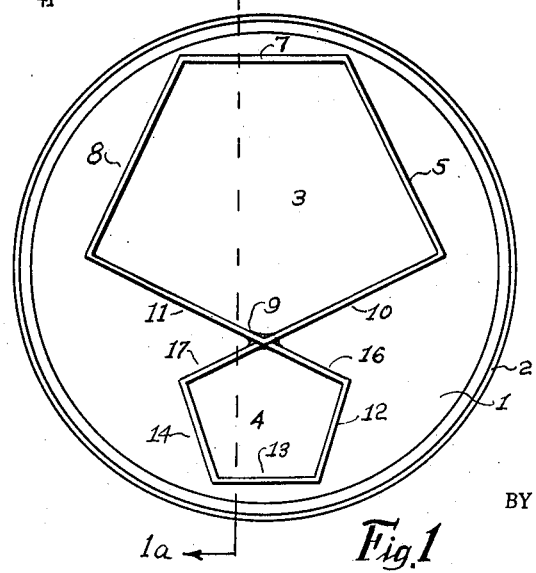
Figure 2:
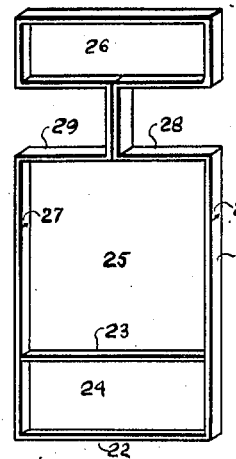

Further objects and merits of the present invention will be better understood in conjunction with the description given in the specification below, when taken in connection with the drawing illustrating embodiments of the invention in which Figure 1 shows the measuring device in one form attached to the top of the container. Figure 1a shows a section taken on the line a—a of Figure 1. Figure 2 shows the measuring device in a second form. Figure 3 shows a further modification of the device of Figure 2, and Figure 4 shows a modification of a detail of Figure 3 in enlarged form. Figure 5 shows a further modification in sectional elevation. Figure 6 shows a top view of Figure 5 and Figure 7 shows a further modification in a view similar to Figure 6.

The means indicated in the figures may be made of wire which may be bent around a form or it may be molded, cast or stamped, or made of plastic or other rigid material, metallic or non-metallic. In Figure 1 the can top is indicated as 1 which may have an upwardly extending rim 2 on the edge of the can. The measuring unit consists of a pair of loops 3 and 4 which may be made of a single piece of wire 5 bent around in loop form and joined to make a continuous wire. The wire 5 as indicated in Figure 1a is wider in the direction normal to the plane of the measuring means than in the plane of the measuring means itself and may be provided with a cutting edge as indicated in Figure 1a. The loop 3 as indicated in Figure 1 may be in the form of a straight line figure of five sides or it may be rectangular in shape as indicated in the other figures. As shown in Figure 1, the loop 3 is so adjusted in size as to measure a certain volume or weight of shortening when properly used. Since practically all shortenings have substantially the same specific gravities, the volumes and weights correspond for practically all shortenings. The larger loop 3 may contain up to the position of the dotted line 6, a cup full of shortening when used in the manner described just below. In using this device it is inserted downward into the shortening in the can with the loop side 7 being furthest down in the can. The operator then uses the top loop 4 to rotate the whole loop about a perpendicular axis, the center axis of the loop, thus cutting out a solid volume of revolution whose cross-sectional area on the axis is of the shape and size formed by the line 6 and the edges 5, 7 and 8. The loop may be so sized that this cross-sectional area will produce a volume of one cup or, if preferred, the loop 3 may be buried in the shortening down to the position of the intersection 9 between the sides 10 and 11. In this case the sides 10 and 11 will also cut the shortening within the loop from the rest of the shortening in the container.

If a smaller measure of shortening is desired the loop is inserted with the small end into the shortening and rotated or twisted around in a similar fashion to measure out a smaller volume. In this case the loop 4 bounded by the sides 12, 13 and 14 may measure a tablespoonful of material, or the measure of a tablespoonful may extend to the intersection and thus at the top be bounded by the sides 16 and 17. As indicated in Figure 1a the edges of the loop are wider in the direction of rotation than in the plane of the loop. This not only will facilitate cutting of the shortening and permit the edges at both sides of the loop to be sharpened but it will also materially aid in keeping the measured shortening on the loop when it is being raised out of the container. For this purpose it is also convenient and highly useful to use a wedge shaped loop as indicated in Figure 1 in which the lowermost part of the loop is smaller than the upper part. This frees the shortening material within the loop from the rest of the material within the container and permits the loop to be raised without touching the material around the loop in the container, since when the loop is raised it is pulled away from the uncut material. In Figure 2 a loop is shown with parallel sides 20 and 21. In this loop the sides 20 and 21, as well as the cross-members 22 and 23, may have a dimension in the direction of the intended rotation of the loop wider than the thickness edge of the loop. The loop enclosed by the sides 20 and 21 and the cross-members 22 and 23, namely the portion 24 may, for instance, measure 2 tablespoons while both loops 24 and 25 may measure a cup of material or a desired number of ounces. There may be graduation lines 26' and 27 on the side members 20 and 21 to indicate weight and volume measurements, if desired.

The operator using the form shown in Figure 2 will embed the loop in the material vertically and then rotate the loop about the vertical symmetrical axis of the loop. If the loop is buried to the cross piece 23 then the mass of material when extracted will be that of a volume of revolution whose cross-section is loop 24. If the loop is buried as far as the members 28 and 29, then the volume extracted will be that cut out by both sections 24 and 25. When the loop has been raised from the material it may be cleared simply by shaking the loop and allowing the mass to fall off. If desired, the top loop 26 may also be used as a measuring loop as for instance a teaspoon or tablespoonful, depending of course on the size of the loop shown. In this case loop 26 is buried in the measured material. The device indicated in Figure 2 may be made from a single flat wire or cast or stamped, if desired.

In the arrangement shown in Figures 3 and 4, there is provided a loop handle 30 with a stem 31 which forks or branches out into two prongs 32 and 33. At the base of these prongs there is inserted a plate 34 which is pivoted by the pivots 35 and 36 at the base of the forks. These pivots may be centrally located with respect to plate 34, or as shown in Figure 4 the corresponding forks 37 and 38 may have the plate 39 balanced in the manner that a compound pendulum is balanced. In this case the plate 39, with the shafts 40 and 41 extending from the ends, may be set at a lower point in the blade so that the plate 39 will normally take a vertical position as it goes down into the material. When the blade 39 is rotated in a horizontal plane, which will, on account of the friction of the material, assume a horizontal position, the blade is raised with the mass of material on it. If raised fairly slowly it will preserve its horizontal position and aid in maintaining the material on the loop. In the modification shown in Figure 3 the plate 34 will also maintain its horizontal position as it is rotated in a horizontal plane and will continue to maintain the same position as the loop is raised. In this case also, the top loop 30 which would ordinarily serve as a handle, may also be used to extract a measured volume or weight of material from the container in the same manner as has been previously described in connection with the modifications of the other figures. The side 33 of the loop 42 may be calibrated in measuring volumes and ounces if desired, as indicated by the calibration lines 43.

In Figures 5, 6, and 7 a modification of the device is shown which may be applied for measuring granulated material as opposed to solids such for instance as coffee, sugar, tea, flour, salt and other such materials. In Figure 5, which is shown in section, the device consists of a flat plate portion 50 which may be of a triangular shape, as shown in Figure 6, and which is made integral with a depressed circular portion 51 at its large end. This depressed circular portion is depressed only slightly to a depth of approximately ⅛ of an inch. The depressed portion 51 will measure a given volume such for instance as a teaspoon or a tablespoon. The principal object is to make this device sufficiently flat so that it may lie on the top of a cover similarly to the unit indicated in Figure 1, or beneath the top cover on the material. The end of the triangular handle portion 50 may be slotted at 52 to provide means for removing the ribbon at the outside of the can which is frequently used for hermetically sealing the contents of the material within the can.

In the arrangement indicated in Figure 7, in place of a flat piece of material as used in the device of Figures 5 and 6, a wire 53 is used which is attached at its two ends to the depressed disk 54, similar to the disk 51. The wire 53 is formed in a triangular shape with a slot 55 at the vertex serving the same purpose as the slot 52.

In the use of the modification shown in Figures 5, 6, and 7, the device is dipped down into the material and then raised upward either vertically or at an angle without rotation as in connection with the devices of the other figures. This device will be preferable for granulated elements and can easily be attached either on the top of the can or placed on the contents of the material of the can.

Having now described my invention, I claim:

1. A means for measuring soft solidified materials from a container which comprises an element formed as a pair of loops joined at a common point, said loops lying in the same plane and one being of a size to measure a large volume while the other being of a size to measure a small volume, the materials of said loops being thicker in sections transverse to the loop than in the plane of the loop, said loops being symmetrical with an axis in the plane of the loops.

2. A means for measuring soft solidified materials from a container which comprises an element formed as a pair of loops joined at a common point, said loops lying in the same plane and one being of a size to measure a large volume while the other being of a size to measure a small volume, the materials of said loops being thicker in sections transverse to the loop than in the plane of the loop, said loops being tapered in the direction of the axis of the loop uniformly away from the point of junction of the two loops.

3. A means for measuring soft solidified materials from a container which comprises an element formed as a pair of loops joined at a common point, said loops lying in the same plane and one being of a size to measure a large volume while the other being of a size to measure a small volume, one of said loops serving as a means for turning the other loop when buried in the material, said loops being symmetrical with respect to an axis in the plane of the said loops.

4. A means for measuring soft solidified materials from a container which comprises an element formed as a pair of loops joined at a common point, said loops lying in the same plane and one being of a size to measure a large volume while the other being of a size to measure a small volume, one of said loops serving as a means for turning the other loop when buried in the material, said common point being in the longitudinal line of symmetry of said loops.

5. A means for measuring soft solidified shortening materials from its vended container which comprises, means lying substantially in a flat plane comprising, a loop of wire with a handle formed at one end thereof, said loop and handle providing a symmetry with an axis lengthwise of the loop and handle, and in said flat plane.

6. A means for measuring soft solidified shortening materials from its vended container comprising, means lying substantially in a flat plane comprising a loop of wire with a handle positioned at one end thereof, said loop and handle being formed of a single wire element, said wire having a width dimension transverse to said plane wider than the thickness of the material in the plane of the loop, said loop and handle providing a symmetry with an axis lengthwise of the loop and handle, and in said flat plane.

CAROL L. STRAUSS.